United States Patent
Esposito

[11] Patent Number: 6,125,657
[45] Date of Patent: Oct. 3, 2000

[54] HINGED EARRING WITH A CURVED POST

[75] Inventor: Joseph Esposito, Warwick, R.I.

[73] Assignee: Prime Time Mfg. Inc., Warwick, R.I.

[21] Appl. No.: 09/246,658

[22] Filed: Feb. 5, 1999

[51] Int. Cl.⁷ ..................................................... A44C 7/00
[52] U.S. Cl. ..................... 63/12; 63/7; 24/598.2
[58] Field of Search .......................... 63/7, 12, 13, 15.45, 63/15.5, 15.7; 24/598.2, 599.9, 645

[56] References Cited

U.S. PATENT DOCUMENTS

| | | | |
|---|---|---|---|
| 28,126 | 5/1860 | Coleman | 24/599.9 |
| 122,328 | 1/1872 | Northup | 63/13 |
| 407,582 | 7/1889 | Duncan | 24/598.2 X |
| 1,003,696 | 9/1911 | Briggs | 63/15.5 |
| 1,209,083 | 12/1916 | Wagner, Jr. | 24/598.2 X |
| 2,045,282 | 6/1936 | Metcalf | 63/7 |
| 4,291,551 | 9/1981 | Levine | 63/12 |
| 4,991,409 | 2/1991 | Creates | 63/15.7 |

FOREIGN PATENT DOCUMENTS

| | | | |
|---|---|---|---|
| 373392 | 1/1907 | France | 63/12 |
| 65910 | 7/1914 | Germany | 63/12 |

Primary Examiner—Terry Lee Melius
Assistant Examiner—Andrea Chop
Attorney, Agent, or Firm—Levisohn, Lerner, Berger & Langsam

[57] ABSTRACT

A hinged hoop-style earring where a post is curved to conform to the outside shape of the back of the earring. In this design, when the earring is closed, the post, and a protruding end of the post, substantially follows the shape of a curved outer edge of the back of the earring. Thus, the post and the protruding end of the post is no longer positioned away from the surface of the earring. Instead, it substantially lies within or adjacent to the contour the curved shape of the back half of the earring and, therefore, will not distort its aesthetical appearance and will not be dangerous.

7 Claims, 2 Drawing Sheets

HINGED EARRING WITH A CURVED POST

FIELD OF THE INVENTION

The present invention relates to jewelry items. More specifically, the present invention relates to a hinged, hoop style earring having a post which is curved to conform to the outside shape of the back of the earring. In this design, when the earring is closed, the protruding end of the post is largely hidden within the contour of the outer surface of the back portion of the earring.

BACKGROUND OF THE INVENTION

Earrings are popular items of jewelry which have been worn by men and women for centuries. The most common and popular earring design has traditionally been the hoop design. The advantages of that design is that such hoop earring is very easy and inexpensive to manufacture. As a result traditional hoops are very affordable. However, a post of the traditional hoop sticks out exposed from the back of an ear, which is not only aesthetically unattractive, but also presents a safety concern because the pointed end of the post is fully exposed and can damage the skin behind the ear and cause an infection. The same problem is present in a hinged hoop earring design utilizing a frictional connection with a straight post, as shown in FIG. 1.

The most common solution to the above problem that has been long known in the industry is to provide a clutch to cover the post on the back of an earlobe. However, such clutches are usually small and get lost easily.

Another possible solution is presented by a design disclosed in U.S. Pat. No. 4,694,664. As shown in FIG. 2, these earrings are constructed as two half-hoops hingedly connected at the bottom. The post at the top is forced and secured into its place within the back half. When the earring is worn, the actual fastening arrangement is invisible. Although such design is aesthetically pleasing, it is expensive to manufacture because it requires a manufacturer to form an annular groove within a back half of the earring. This, in turn, requires an additional process in the chain of production, therefore, making the resulting jewelry less affordable.

Over the years, different designs of hinged hoop-style earrings has been presented. However, there is still a need in the industry for an earring that combines affordability of a traditional hoop with an aesthetically pleasing and safe design for the earring post.

SUMMARY OF THE INVENTION

It is an object of the present invention to provide an earring design which will make the manufacturing process less expensive, while providing the wearer with an aesthetically pleasing and safe earring.

Other objects, advantages and features of this invention will become more apparent hereinafter.

The invention accomplishing the above objectives is a hinged hoop-style earring where a post is curved to conform to the outside shape of the back of the earring. In this design, when the earring is closed, the post, and a protruding end of the post, substantially follows the shape of a curved outer edge of the back of the earring. Thus, the post and the protruding end of the post is no longer positioned away from the surface of the earring. Instead, it substantially lies within or adjacent to the contour the curved shape of the back half of the earring and, therefore, will not distort its aesthetical appearance and will not be dangerous.

BRIEF DESCRIPTION OF THE DRAWINGS

A full understanding of the invention can be gained from the following description of the preferred embodiment when read in conjunction with the accompanying drawings in which.

DETAILED DESCRIPTION OF THE PREFERRED EMBODIMENT AND THE DRAWINGS

Figure 1:
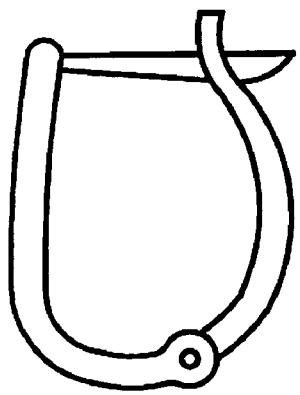
FIG. 1 shows an enlarged side view of a prior art hinged earring with a straight post.
Figure 2:
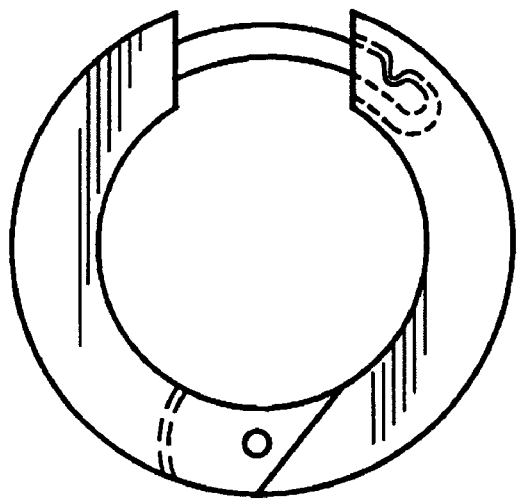
FIG. 2 shows an enlarged side view of another prior art earring design.
Figure 3:
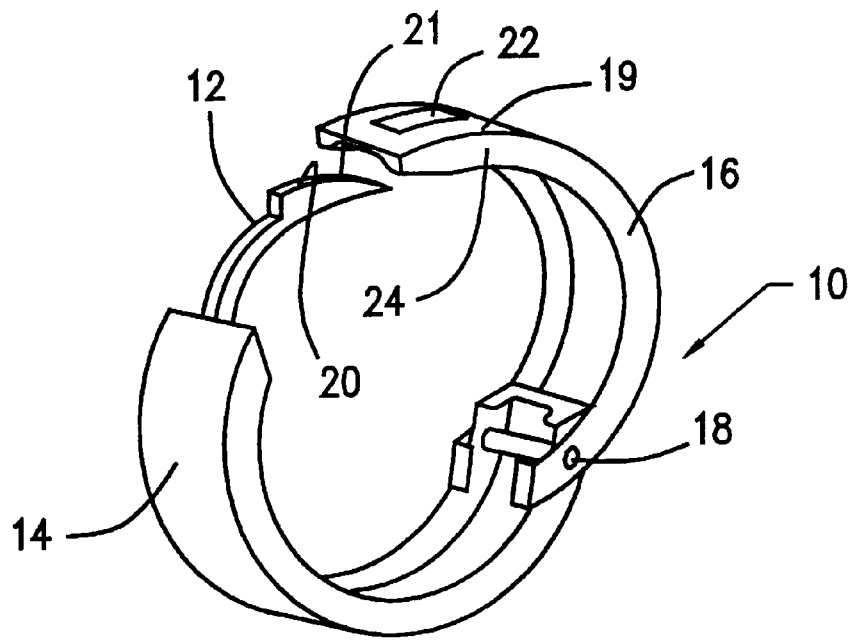
FIG. 3 shows an enlarged perspective view of a hinged earring with a curved post in accordance with the present invention when the earring is open.
Figure 4:
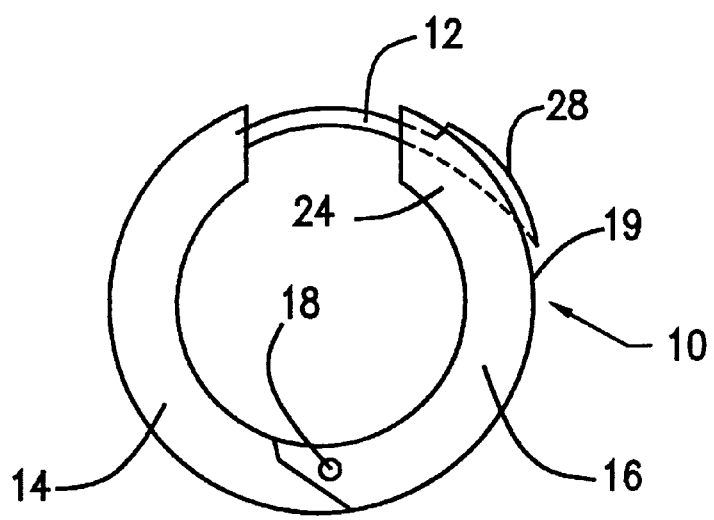
FIG. 4 shows an enlarged side view of a hinged earring with a curved post in accordance with the present invention when the earring is closed.

As best seen in FIGS. 3 and 4 of the drawings, a hinged hoop style earring 10 is provided with a post 12 frictionally connecting its front and back halves, respectively designated with reference numbers 14 and 16. In the preferred embodiment, both halves of the earring have ornamental or decorative surfaces, or may serve as settings for stones. The halves 14 and 16 are hingedly connected together at their lower ends by a hinge pin 18. Both earring halves can be rotated about an axis of the hinge pin 18 to bring them together for closing or take them apart for opening the earring. The halves 14 and 16 can be constructed in a way to allow them to form a substantially round or oval shape when the earring is closed.

The two halves are fastened together at their upper portions with the earring post 12 mounted on the front half 14 and extending toward the back half 16 of the earring 10. In accordance with the present invention, the post 12 has a curved shape substantially conforming to a curve of an outside surface 19 of the back half of the earring. The post is preferably provided with a notch 20, which can be traditionally shaped as a hook, located at a free end of the post 12. Post 12 is typically formed of a wire having a circular cross-section. Its length should slightly exceed thickness of an earlobe for which it is designed, so that only the very end of the post 12 can be visible from the back half 16. The earrings may be made of gold in a preferred embodiment, but the post 12 can be made of any precious or non-precious metal. It is adapted to be selectively passed through a pierced hole in a person's earlobe in a conventional manner.

The back half 16 preferably has an aperture 22 in its upper portion 24 for accommodating the earring post 12. The aperture, which can be of any traditional shape, is located where the post 12 normally intersects the back half 16 as the earring is closed. When the earring post is inserted through a pierced ear lobe, it passes through the aperture 22 and is frictionally held therein, thereby releasably locking the back half 16 via the notch 20 to the front half 14. As this fastening is accomplished, a portion of the post 12 will pass beyond the aperture 22. In accordance with this invention, the distal end 27 of the post 12 is curved downwardly to conform to the curved shape of the back half 16. Thus, the post 12 shadows the outside surface 19 substantially positioning a protruding portion 28 of the distal end 27 adjacent to the surface 19. As opposed to fully exposed pointed end, the curvature of the portion of the post, extending through the aperture, shields the free pointed end, thereby reducing the possibility of injury.

In order to remove the earring from the ear lobe, the wearer will need to merely pull apart the front and the back halves, thereby releasing the earring post 12 from the aperture 22.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

I claim as follows:

1. A hinged hoop-style earring comprising:

first and second curved ornamental members, each ornamental member having a respective upper portion and lower portion, said lower portions of the ornamental members hingedly connected together;

an earring post attached to said upper portion of said first ornamental member extending toward said second ornamental member, said earring post having a free end, a forward portion and a rear portion, said upper portion of said second ornamental member having a curved outer edge, said earring post comprising a curved shape substantially conforming to the curved outer edge of said upper portion of said second ornamental member;

an aperture located within said upper portion of said second ornamental member through which said earring post passes and is frictionally held therein, said forward portion of said earring post passing beyond said aperture, said forward portion substantially following the shape of said curved outer edge of said upper portion of said second ornamental member, said earring post being so dimensioned such that when said earring post is frictionally held in said second ornamental member said rear portion of said earring post is exposed permitting it to rest on a pierced ear of a user, said free end of said earring post extending beyond said aperture and along the upper portion of said second ornamental member when said earring post is frictionally held in place.

2. A hinged hoop-style earring according to claim 1, wherein said earring post has a notch between said front and rear portions for releasably locking said earring post to said second ornamental member.

3. A hinged hoop-style earring according to claim 1, wherein said earring comprises a round overall shape when the earring post is frictionally held in said second ornamental member.

4. A hinged hoop-style earring according to claim 1, wherein said earring comprises an oval overall shape when the earring post is frictionally held in said second ornamental member.

5. A hinged hoop-style earring according to claim 1, wherein said aperture is located where said post is frictionally held in said second ornamental member.

6. A hinged hoop-style earring according to claim 1, wherein said free end extending beyond said aperture closely hugs the shape of the curved outer edge.

7. A hinged hoop-style earring according to claim 1, wherein said free end comprises a pointed end and wherein said curved shape of said post shields said pointed end of said post to prevent injury.

* * * * *